Nov. 6, 1951     A. J. PETZINGER     2,573,929
TEMPERATURE-COMPENSATED PHASE-CORRECTED THERMAL INSTRUMENT
Filed July 26, 1947
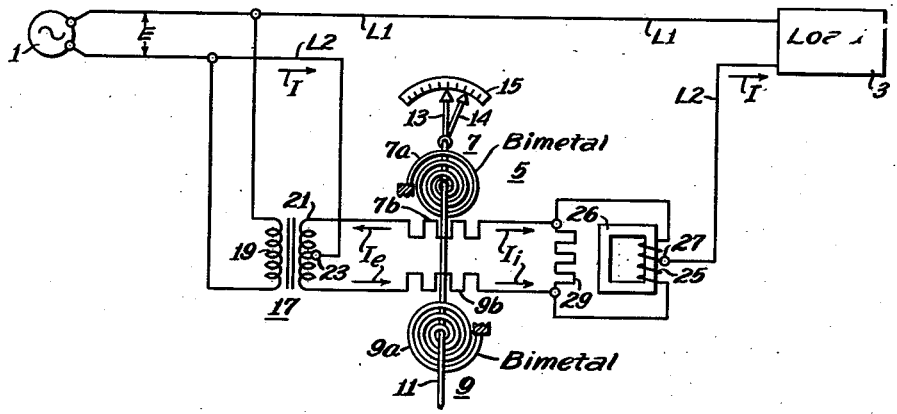
*Fig. 1.*
*Fig. 2.*
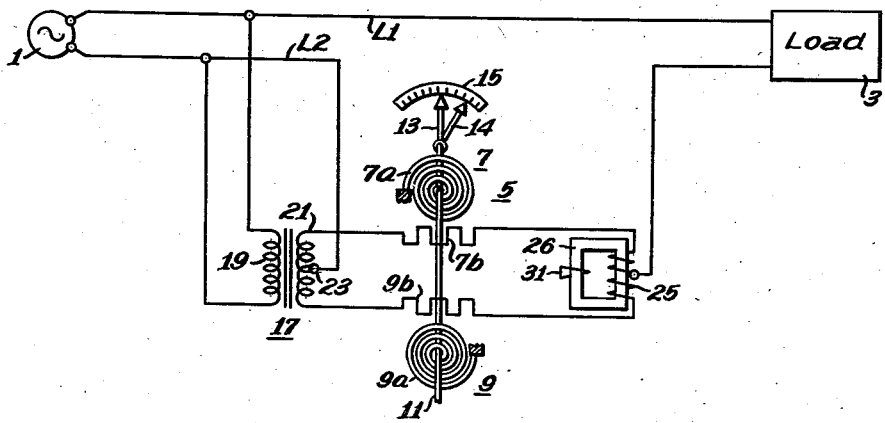
WITNESSES:
Robert C. Baird
Nw. L. Groome
INVENTOR
Ambrose J. Petzinger.
BY C. L. Freedman
ATTORNEY Patented Nov. 6, 1951

2,573,929

UNITED STATES PATENT OFFICE 2,573,929

TEMPERATURE-COMPENSATED PHASE-CORRECTED THERMAL INSTRUMENT

Ambrose J. Petzinger, Fair Lawn, N. J., assignor to Westinghouse Electric Corporation, East Pittsburgh, Pa., a corporation of Pennsylvania Application July 26, 1947, Serial No. 763,809

12 Claims. (Cl. 171—34)

1

This invention relates to electrical systems employing transformers and it has particular relation to thermal instruments employing transformers wherein a predetermined phase relationship is desired between input and output quantities of the transformer.

It is well known in the art that transformers have phase displacement errors. For a discussion of such errors, reference may be made to the Electrical Metermen's Handbook, 5th edition, 1940, published by the Edison Electric Institute, New York city. A discussion of phase displacement errors will be found in section 9 of the handbook.

If an output quantity of a transformer is to be employed alone, the phase displacement error may be of minor importance. For example, a voltage transformer may be employed for energizing a voltmeter. In such a case, the phase displacement error of the transformer need not be considered.

However, if the phase displacement between the output of the transformer and some other alternating quantity is important, the phase displacement error of the transformer may require serious consideration. Such relationships are encountered in various instruments such as relays, watthour meters and wattmeters. The thermal demand wattmeter falls within this class of apparatus and the invention will be discussed with reference thereto.

In a thermal demand wattmeter, a pair of thermo-responsive units have their outputs differentially associated to provide a resultant output. Each of the thermoresponsive units includes one or more heaters. If the thermoresponsive unit is of the spiral bimetallic type, the bimetallic element itself may constitute the heater for the thermoresponsive unit, or a separate heater may be employed. The heaters are energized by two current components. One of these current components corresponds to the voltage of a circuit with which the meter is associated. The second component corresponds to the current flowing in the associated circuit. One of these components usually is supplied through a transformer and is subject to the aforesaid displacement error.

It will be understood that a predetermined phase relationship is desired between the two current components. For example when the meter is connected for operation as a wattmeter, it is desired that when the associated circuit operates at unity power factor the two current components be in phase or in phase opposition with each other. A typical thermal demand meter is described in the Vassar Patent 2,323,738.

In accordance with the invention, the secondary circuit of the transformer employed in a thermal demand meter has its resistive imped-

2 ance and reactive impedance proportioned to compensate for the phase displacement error of the transformer. In addition, the reactive impedance is provided with a temperature coefficient of reactance for the purpose of compensating the meter for errors otherwise introduced by variations in temperature of the parts.

It will be recalled that the secondary circuit carries two current components, only one of which may require compensation. The reactive impedance preferably is constructed to provide substantially no reactive impedance to that one of the current components which does not require compensation. In a preferred embodiment of the invention, a reactive impedance takes the form of a center-tapped inductive reactor. One of the current components is directed through the two halves of the reactor in series whereas the remaining component is directed through the two halves of the reactor in parallel.

It is, therefore, an object of the invention to provide an electrical system having a transformer with compensation for the phase displacement error introduced by the transformer.

It is a further object of the invention to provide an electrical system having a transformer with a secondary circuit for the transformer wherein reactive impedance and resistive impedance of the secondary circuit are proportioned to compensate for the phase displacement error of the transformer.

It is also an object of the invention to provide an electrical system as defined in the preceding paragraph wherein the reactive impedance is provided with a temperature coefficient of reactance for the purpose of compensating the phase displacement error over a substantial range of temperature variation.

It is a still further object of the invention to provide a thermal instrument for measuring a function of the product of voltage and current in an electrical circuit wherein a transformer is employed and wherein compensation is provided for the phase displacement error of the transformer.

Other objects of the invention will be apparent from the following description taken in conjunction with the accompanying drawing, in which:

Figure 1 is a schematic view of an electrical system embodying the invention; and Figure 2 is a schematic view showing a modification of the system illustrated in Fig. 1.

Referring to the drawing, Figure 1 shows an electrical circuit for supplying electrical energy from a suitable source 1 to a load 3. Although the circuit may be a polyphase or single-phase circuit as desired, it will be assumed for the purpose of discussion that the circuit is a single-phase circuit having two conductors L1 and L2 and operating at a frequency of 60 cycles per second. The source 1 may represent an alternating current generator capable of supplying a voltage E to the circuit for the purpose of directing a current I through the load 3.

For the purpose of measuring a function of the product of the voltage E and the current I supplied to the load 3, a thermal instrument 5 is provided. This thermal instrument may be designed to measure various functions of the voltage E and the current I, such as watts, vars, or volt amperes. For present purposes, it will be assumed that the thermal instrument 5 is a thermal demand wattmeter.

The thermal demand wattmeter 5 includes two thermoresponsive units 7 and 9 which have heaters associated therewith. If spiral bimetallic elements are employed in the thermoresponsive units, the elements themselves may be employed as heaters. However, it will be assumed that each of the units includes a spiral bimetallic spring 7a or 9a having its inner end connected to a shaft 11 and having its outer end secured to a suitable supporting structure. It will be noted that the spiral springs are differentially associated with the shaft 11. Consequently, rotation of the shaft 11 is dependent on a difference between the torques exerted on the shaft by the bimetallic springs. The bimetallic spring 7a is supplied with a separate heater 7b and the bimetallic spring 9a similarly is provided with a separate heater 9b. Although as shown in the aforesaid Vassar patent more than one heater may be employed for each spring, for the purpose of simplicity only one heater is shown in Fig. 1 for each spring. The shaft 11 may have a pointer 13 secured thereto for indicating on a suitable scale 15 the power supplied by the source 1 to the load 3. A maximum demand pointer 14 also may be provided in the manner set forth in the aforesaid Vassar patent.

In order to energize the heaters 7b and 9b, a transformer 17 has its primary winding 19 connected across the conductors L1 and L2 for energization in accordance with the voltage E. In some cases the primary winding 19 may represent the voltage coil of a watthour meter. Such a modification is illustrated in the aforesaid Vassar patent.

The transformer 17 has a secondary winding 21 which is provided with a center tap 23. The terminals of the secondary winding are connected respectively to one terminal of each of the heaters 7b and 9b. Consequently, the secondary winding supplies to the heaters a current component $I_e$ which depends for its value on the voltage E of the associated coil.

It will be noted that the conductor L2 is broken into two parts, one of which is connected to the source 1 and the other of which is connected to the load 3. The portion of the conductor L2 which is connected to the source 1 also is connected to the tap 23 for the purpose of supplying to the heaters 7b and 9b current components $I_1$. Each of the components $I_1$ has a value equal to one-half of the line current I. It will be noted that the current components add in the heater 9b and subtract in the heater 7b. The arrows in Fig. 1 represent instantaneous directions of flow for the various currents.

Since the thermal instrument 5 is designed to measure watts, the current components $I_e$ and $I_1$ should be in phase or in phase opposition in the heaters when the voltage E and the current I of the associated circuit are in phase. If the transformer 17 were a perfect transformer, such a relationship would be obtained. However, it will be recalled that the transformer 17 has a phase displacement error. Consequently, the desired phase relationship between the current components is not obtained by the action of the transformer 17 alone.

The load on the secondary winding 21 represented by the heaters 7b and 9b is substantially a resistive load. This means that the current component $I_e$ is substantially in phase with the voltage induced in the secondary winding 21. By introducing a suitable reactive impedance in the secondary circuit of the transformer 17, the phase relationship between the current component $I_e$ and the voltage induced in the secondary winding 21 may be adjusted until the desired phase relationship is obtained between the current component $I_e$ and the voltage E. It will be recalled that this relationship is such that when the load 3 is a unity power factor load, the current component $I_e$ is in phase agreement with the line voltage E (since the connections determine whether the voltage E and the current component $I_e$ are in phase or in phase-opposition in the respective heaters, it will be understood that both conditions are intended to be covered by the expression "in phase agreement").

The desired reactive impedance for the secondary circuit of the transformer 17 may be obtained by increasing the leakage reactance of the secondary winding 21. However, in many cases, it is impracticable to obtain the desired reactive impedance by this procedure.

A further alternative would be to include a separate inductive reactor in series with each of the heaters 7b and 9b. Such a solution would be satisfactory if the inductive reactance remains constant for all values of current passing through the reactor. If an iron core is employed for the inductive reactor, the desired constancy may not be obtained. This is for the reason that the permeability of iron varies somewhat with the density of magnetic flux in the iron. The resulting variation in the magnitude of the inducitve reactance is particularly objectionable because such reactors carry two current components $I_e$ and $I_1$, and the current component $I_1$ in most cases may vary in magnitude over a substantial range.

In order to provide a substantially constant inductive reactance, the reactors associated with the heaters 7b and 9b may be mutually coupled. For example, they may be provided with a common magnetic core as shown in Fig. 1. In Fig. 1, the reactor takes the form of an inductance coil or winding 25 having a center tap 27. This winding surrounds a leg of a soft iron core 26, preferably laminated. The center tap 27 is connected to the load 3 through the portion of the conductor L2 associated with the load.

By inspection of Fig. 1, it will be observed that the magnetomotive forces produced in the common magnetic core by the current components $I_1$ passing through their respective halves of the winding 25 are in opposition. Consequently, the winding 25 offers substantially no inductive impedance to the current components $I_1$. However, the magnetomotive forces produced by the current component $I_e$ flowing through the halves of the winding 25 are additive. For this reason, the winding 25 offers inductive impedance only to the current component $I_e$ and this is the desired condition of operation. By proper proportioning of the inductive impedance offered by the winding 25 and the resistive impedance offered by the resistors 7b and 9b, the current component $I_e$ may be brought substantially into phase (or phase opposition) with the voltage E. It will be understood that other parts of the loop formed by the secondary winding 21, the heater 7b and 9b and the winding 25 introduce some inductive and resistive impedance but the desired relationship may be obtained by proper selection of the inductance and resistance introduced by the winding 25.

The various elements employed may have temperature coefficients of impedance. For example, the heaters 7b and 9b may have a substantial positive coefficient of resistance. In order to maintain the desired phase relationship between the current component $I_e$ and the voltage E over a substantial variation in temperature of the various parts, the inductive impedance represented by the winding 25 may be designed to introduce a substantial temperature coefficient of inductive impedance. This may be done in various ways. For example, in Fig. 1 a resistor 29 having a substantial positive temperature coefficient of resistance is connected across the winding 25. The impedance of the winding 25 is made up largely of inductive reactance and such reactance does not change with temperature. As the temperature of the resistor 29 increases, the resistance thereof also increases and a greater proportion of the current component $I_e$ is diverted through the winding 25. As a result, the effective inductive impedance of the parallel unit consisting of the winding 25 and the resistor 29 increases with temperature. By proper proportioning of the resistor 29 and the winding 25 the ratio of total reactive to resistive impedance for the circuit through which the current component $I_e$ flows may be adjusted to compensate as desired for temperature variations. For example, the ratio may be maintained substantially constant over a substantial range of variation of temperature, as from minus 20° C. to plus 50° C.

As previously pointed out, if the resistive impedance of the winding 25 is small compared to the inductive impedance thereof, the total impedance of the winding 25 does not change appreciably with temperature. Consequently, an increase in resistance of the resistor 29 due to an increase in temperature results in the passage of an increased percentage of the current component $I_e$ through the winding 25. If the resistance of the winding 25 is small compared to that of the resistor 29, the increase in the percentage of the current component $I_e$ which flows through the winding 25 may result in an effective temperature coefficient of resistance for the parallel unit consisting of the winding 25 and the resistor 29 which is less positive than the coefficient for the resistor 29 and which may be negative if so desired. This is true even though the winding and the resistor are constructed of the same material, such as copper, and therefore have the same individual temperature coefficients. The provision of an effective negative temperature coefficient of resistance for the parallel unit tends to compensate to some extent for the positive temperature coefficient of resistance of the heaters and of the transformer windings and results in an improvement in performance of the instrument over a substantial range of temperature variation.

To illustrate the practicability of the invention by specific example, a standard thermal demand wattmeter was provided with the winding 25, the core 26 and the resistor 29 of Fig. 1. The winding consisted of eighteen turns of No. 12 copper wire wound on an arm of a laminated soft iron core. The resistor consisted of one foot of No. 22 copper wire.

At 50% power factor lagging, the error of a standard polyphase meter has been reduced by the teachings of the invention from 20% (low) to zero. At the same time, the maximum temperature error was reduced from a maximum of 24% to a maximum of less than 4% over and ambient temperature range of −23° C. to +57° C.

In order to obtain the desired temperature coefficient of inductive reactance, the embodiment illustrated in Fig. 2 may be employed. The embodiment of Fig. 2 is similar to that of Fig. 1 except for the omission of the resistor 29. The desired temperature coefficient is obtained by providing a closed winding 31 for the magnetic core 26. The windings 25 and 31, together with the magnetic core 26, now constitute in effect a transformer wherein the winding 25 represents a primary winding and the winding 31 represents a closed secondary winding. If the winding 31 has a substantial positive temperature coefficient of resistance, the effective inductance offered by the winding 25 increases with an increase in temperature of the parts. Consequently, by proper selection of the temperature coefficient of reistance of the winding 31, the desired variation in effective inductance with respect to temperature is obtained.

It will be observed that the two modifiactions illustrated in the drawing in effect lag the current component $I_e$ relative to the voltage E. If desired, the current component may be overlagged in this manner for measurement of volt amperes at a predetermined power factor. For example, let it be assumed that the current component $I_e$ is lagged in accordance with the teachings of the invention to bring it into phase (or phase opposition) with the current components $I_1$ when the power factor of the associated circuit represented by the conductors L1, L2, the source 1 and the load 3 is approximately 80% lagging. The thermal instrument 5 then may be calibrated to read the volt amperes for the associated circuit. In this case the associated circuit is assumed to operate normally at a power factor of about 80% lagging.

Although the invention has been described with reference to certain specific embodiments thereof, numerous modifications are possible. Therefore, the appended claims are intended to cover not only the specific embodiments illustrated but also all other embodiments falling within the spirit and scope of the invention.

I claim as my invention:

1. In an electrical system, a transformer having a primary winding and a secondary winding, a terminal, a separate conductive arm connecting each of the ends of the secondary winding to the terminal, each of said arms including an impedance having a ratio of reactive to resistive impedance selected to maintain the current supplied by the secondary winding substantially in phase agreement with the voltage across the primary winding, translating means responsive to the energizations of said arms, the reactive impedance in each of the arms comprising a separate half of a center-tapped inductive reactor, said reactor having its center tap connected to said terminal, and means including the terminal for energizing the arms in parallel.

2. A system as defined in claim 1, wherein the reactive impedance has a positive temperature coefficient of inductance.

3. A system as defined in claim 1, wherein the reactive impedance comprises a resistor connected in parallel with the inductive reactor.

4. A system as defined in claim 1, wherein the reactive impedance comprises a closed secondary winding inductively coupled to said inductive reactor.

5. A thermal instrument having a pair of thermoresponsive units each including an electrical heater, and having means differentially associating the outputs of the thermoresponsive units to provide a resultant output, in combination with a transformer having a primary winding and a center-tapped secondary winding, and an impedance device comprising a center-tapped inductive reactor, a first one of the electrical heaters being connected between a first terminal of the secondary winding and a first terminal of the reactor, and a second one of the electrical heaters being connected between the remaining terminals of the secondary winding and the reactor, whereby the secondary winding, the reactor and the electrical heater constitute a closed electrical loop, and whereby the loop may be energized through the center taps of the secondary winding and the reactor.

6. A thermal instrument as defined in claim 5 wherein the impedance device has a positive temperature coefficient of reactance proportioned to maintain alternating current flowing in the loop circuit substantially in phase agreement with alternating voltage applied to the primary winding over a substantial range of temperature variation.

7. A thermal instrument as defined in claim 5, wherein the impedance device comprises a resistor connected in parallel with the reactor, said resistor having a positive temperature coefficient of resistance.

8. A thermal instrument as defined in claim 5, wherein the impedance device comprises a closed winding having a positive temperature coefficient of resistance inductively coupled to the reactor.

9. A measuring device having a watthour meter provided with a voltage winding, having a thermal instrument comprising a pair of thermoresponsive units each including an electrical heater, and having means differentially associating the outputs of the thermoresponsive units to provide a resultant output, in combination with a transformer having said voltage winding for a primary winding and a center-tapped secondary winding, and an impedance device comprising a center-tapped inductive reactor, a first one of the electrical heaters being connected between a first terminal of the secondary winding and a first terminal of the reactor, and a second one of the electrical heaters being connected between the remaining terminals of the secondary winding and the reactor, whereby the secondary winding, the reactor and the electrical heater constitute a closed electrical loop, and whereby the loop may be energized through the center taps of the secondary winding and the reactor.

10. A measuring device as defined in claim 9 wherein the impedance device has a positive temperature coefficient of reactance proportioned to maintain alternating current flowing in the loop circuit substantially in phase agreement with alternating voltage applied to the primary winding over a substantial range of temperature variation.

11. A measuring device having a watthour meter provided with a voltage winding, in combination with a transformer having said voltage winding for a primary winding and having a secondary winding, a load for said secondary winding and connections between said secondary winding and said load for energizing the load from the secondary winding, said connections establishing a secondary circuit including the secondary winding and said load, said secondary circuit having reactive impedance and resistive impedance embodied therein and proportioned to maintain alternating current supplied by the secondary winding substantially in phase agreement with alternating voltage applied to the primary winding.

12. A device as defined in claim 11 wherein the reactive impedance comprises an inductive reactance having a positive temperature coefficient of inductance.

AMBROSE J. PETZINGER.

REFERENCES CITED

The following references are of record in the file of this patent:

UNITED STATES PATENTS

| Number | Name | Date |
| --- | --- | --- |
| 1,201,639 | Schmiedel | Oct. 17, 1916 |
| 1,761,764 | Witherow | June 3, 1930 |
| 1,863,936 | Schwager | June 21, 1932 |
| 1,994,279 | Higgins | Mar. 12, 1935 |
| 2,228,655 | Downing | Jan. 14, 1941 |
| 2,345,028 | Bradshaw | Mar. 28, 1944 |